United States Patent
Sasaki et al.

(10) Patent No.: US 7,280,997 B2
(45) Date of Patent: Oct. 9, 2007

(54) NUMERICAL INFORMATION RETRIEVING DEVICE FOR TRANSFORMING THE FORM IN WHICH NUMERICAL INFORMATION IS PRESENTED

(75) Inventors: Mkiki Sasaki, Osaka (JP); Atsushi Ikeno, Kyoto (JP)

(73) Assignee: Oki Electric Industry Co., Ltd., Tokyo (JP)

(*) Notice: Subject to any disclaimer, the term of this patent is extended or adjusted under 35 U.S.C. 154(b) by 436 days.

(21) Appl. No.: 10/722,567

(22) Filed: Nov. 28, 2003

(65) Prior Publication Data
US 2005/0044118 A1    Feb. 24, 2005

(30) Foreign Application Priority Data
Nov. 29, 2002   (JP)   ............... 2002-346977

(51) Int. Cl.
*G06F 17/30* (2006.01)
(52) U.S. Cl. .................. 707/1; 707/4; 707/6
(58) Field of Classification Search ............. None
See application file for complete search history.

(56) References Cited

U.S. PATENT DOCUMENTS

| | | | |
|---|---|---|---|
| 5,408,638 A * | 4/1995 | Sagawa et al. | 716/20 |
| 5,761,389 A * | 6/1998 | Maeda et al. | 706/59 |
| 6,341,176 B1 * | 1/2002 | Shirasaki et al. | 382/229 |
| 6,466,940 B1 * | 10/2002 | Mills | 707/102 |
| 6,523,025 B1 * | 2/2003 | Hashimoto et al. | 707/3 |
| 6,602,300 B2 * | 8/2003 | Ushioda et al. | 715/536 |
| 6,643,641 B1 * | 11/2003 | Snyder | 707/4 |
| 6,879,987 B2 * | 4/2005 | Hsieh | 707/104.1 |
| 2004/0039730 A1 * | 2/2004 | Saeki | 707/2 |
| 2005/0216447 A1 * | 9/2005 | Talib et al. | 707/3 |

FOREIGN PATENT DOCUMENTS

JP    7-200583    8/1995

OTHER PUBLICATIONS

Stephane Lavirotte & Loic Pottier. Optical Formula Recognition. IEEE 1997.*

* cited by examiner

*Primary Examiner*—Neveen Abel-Jalil
(74) *Attorney, Agent, or Firm*—Rabin & Berdo, PC (57) ABSTRACT

In order to realize a numerical information retrieving device which permits a user to retrieve numerical information without caring about representations or unit systems, the numerical information retrieving device of the present invention includes an input arrangement for inputting any document to-be-retrieved or any numerical expression to be retrieved, an attribute information dictionary which stores attribute names indicative of attributes and conditions for bestowing the attributes, an attribute bestowal arrangement for bestowing an attribute on the inputted document or numerical expression by referring to the attribute information dictionary, a conversion information dictionary, and a numerical conversion arrangement.

4 Claims, 8 Drawing Sheets

| ATTRIBUTE NAME | CONDITION |
|---|---|
| LENGTH | NUMBER + "NANOMETER" |
| LENGTH | NUMBER + "nm" |
| LENGTH | NUMBER + "mm" |
| ⋮ | ⋮ |

FIG. 6

| ATTRIBUTE NAME | CHARACTER STRING BEFORE CONVERSION | CHARACTER STRING AFTER CONVERSION |
|---|---|---|
| LENGTH | NANOMETER | *10**-9m |
| LENGTH | nm | *10**-9m |
| LENGTH | mm | *10**-3m |
| ⋮ | ⋮ | ⋮ |

| ATTRIBUTE NAME | RANGE SPECIFYING WORD | COMPARING CONDITION | ALIGNMENT ORDER |
|---|---|---|---|
| LENGTH | NOT MORE THAN | < =, <, = = | ASCENDING ORDER |
| LENGTH | EQUAL TO OR LESS THAN | < =, <, = = | DESCENDING ORDER |
| LENGTH | LESS THAN | < | ASCENDING ORDER |
| ⋮ | ⋮ | ⋮ | ⋮ |

NUMERICAL INFORMATION RETRIEVING DEVICE FOR TRANSFORMING THE FORM IN WHICH NUMERICAL INFORMATION IS PRESENTED

FIELD OF THE INVENTION

The present invention relates to a numerical information retrieving device which retrieves numerical information in a natural language.

BACKGROUND OF THE INVENTION

In order to make numerical information retrievable in a natural language, a retrieving device needs to cope with numerical expressions.

With a prior-art numerical information retrieving device, as in a technique stated in, for example, JP-A-7-200583, a numerical/temporal expression containing a relative expression can be handled as an input sentence by taking note of contextual information and information on the reference and range of the temporal/numerical expression. With such a prior-art numerical information retrieving device, by way of example, the "next year" is completed or corrected as being "1991" relative to "1990", Likewise, the "next" is completed or corrected as being the "fourth place" relative to the "first to third places".

The prior-art numerical information retrieving device, however, cannot cope with representations such as units, numerical representations of various references, or numerical expressions of various references.

By way of example, although the "increase of 100 dollars" relative to "1000 dollars" may be simply completed or corrected as being "+100", the "increase of 1 centimeter" or "increase of 1 mm" relative to "1 meter" cannot be completed or corrected unless numerical conversion is first performed.

The present invention has for its object to solve such a problem in the prior art, and to provide a numerical information retrieving device with which a user can retrieve numerical information without caring about numerical representations or unit systems.

SUMMARY OF THE INVENTION

In order to solve the problem, the numerical information retrieving device of the present invention consists in a numerical information retrieving device for retrieving numerical information in a natural language, characterized by comprising input means for inputting any document to-be-retrieved or any numerical expression to-be-retrieved; an attribute information dictionary which stores therein attribute names indicative of attributes, and conditions for bestowing the attributes; attribute bestowal means for bestowing an attribute on the inputted document or numerical expression by referring to said attribute information dictionary; a conversion information dictionary which stores attribute names indicative of attributes, non-converted character strings, and converted character strings therein; and numerical conversion means for converting a numerical value of a part of the document or numerical expression as is endowed with the attribute, from a non-converted character string into a converted character string by referring to the conversion information dictionary, thereby to convert numerical information of the part endowed with the attribute.

DETAILED DESCRIPTION OF THE PREFERRED EMBODIMENTS OF THE INVENTION

First Embodiment

Figure 1:
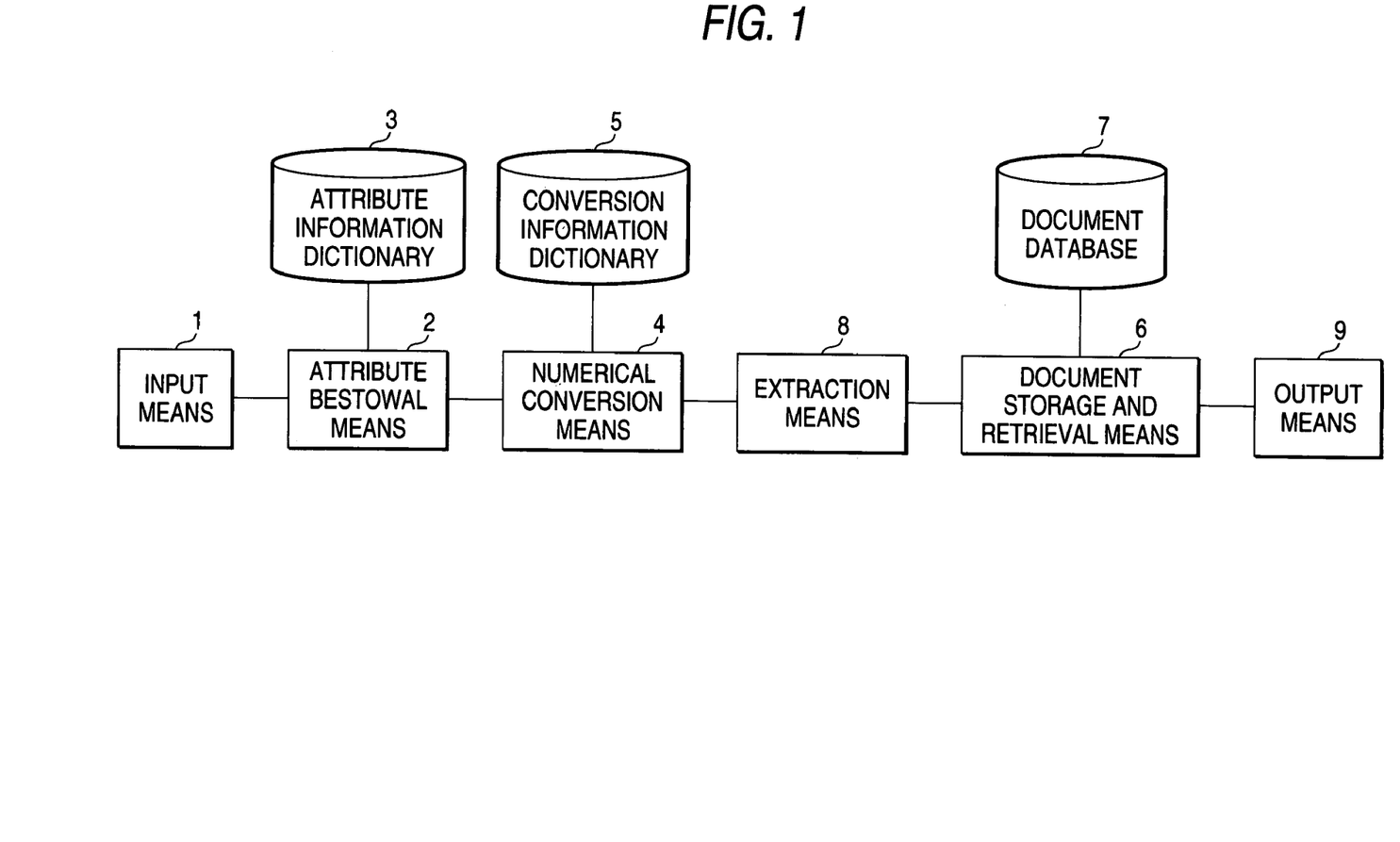
FIG. 1 is a block arrangement diagram of a numerical information retrieving device in the first embodiment of the present invention.

FIG. 1 is a block arrangement diagram of a numerical information retrieving device in the first embodiment of the present invention. The numerical information retrieving device of the first embodiment includes input means 1, attribute bestowal means 2, an attribute information dictionary 3, numerical conversion means 4, a conversion information dictionary 5, document storage and retrieval means 6, a document database 7, extraction means 8, and output means 9.

The input means 1 is means for inputting a document to-be-retrieved or a numerical expression to-be-retrieved. This input means 1 sends the inputted document or numerical expression to the attribute bestowal means 2.

The attribute bestowal means 2 is means for bestowing an attribute. This attribute bestowal means 2 bestows the "opening tag" and "closing tag" of the attribute before and behind the condition part of the document or numerical expression inputted from the input means 1, by referring to the attribute information dictionary 3, and it sends the resulting document or numerical expression to the numerical conversion means 4.

The attribute information dictionary 3 is a dictionary for storing the information of attributes therein. The attribute information items in the attribute information dictionary 3 consist of sets of attribute names and conditions.

The numerical conversion means 4 is means for converting numerical information. This numerical conversion means 4 converts the part of the non-converted character string of the attribute into the part of the converted character string thereof for the document or numerical expression endowed with the attribute as inputted from the attribute bestowal means 2, by referring to the conversion information dictionary 5, and it sends the resulting document or numerical expression to the extraction means 8.

The conversion information dictionary 5 is a dictionary for storing the information of numerical conversion therein. The conversion information items in the conversion information dictionary 5 consist of sets of attribute names, non-converted character strings and converted character strings.

The document storage and retrieval means 6 is means for storing and retrieving documents. This document storage and retrieval means 6 stores the document after the attribute bestowal conversion, the original document and a retrieval keyword as inputted from the extraction means 8, in the document database 7, and it retrieves any document whose retrieval keyword agrees with the numerical expression endowed with the attribute as inputted from the extraction means 8, from the document database 7, so as to send the retrieved document to the output means 9.

The document database 7 is a database in which documents to be retrieved and documents after the attribute bestowal conversion are stored.

The extraction means 8 is means for extracting keywords and pertinent parts. This extraction means 8 sends the document storage and retrieval means 6 the converted document and numerical expression which have been inputted from the numerical conversion means 4, and the retrieval keyword as which the converted part of the attribute has been extracted.

The output means 9 is means for outputting a result. This output means 9 outputs the retrieved result sent from the document storage and retrieval means 6.

Incidentally, the process for bestowing the attribute, the process for databasing the documents, the process for storing or retrieving the document, and the process for extracting the pertinent part as stated above can be respectively realized with known natural language processing technologies as regards general parts.

Figure 2:
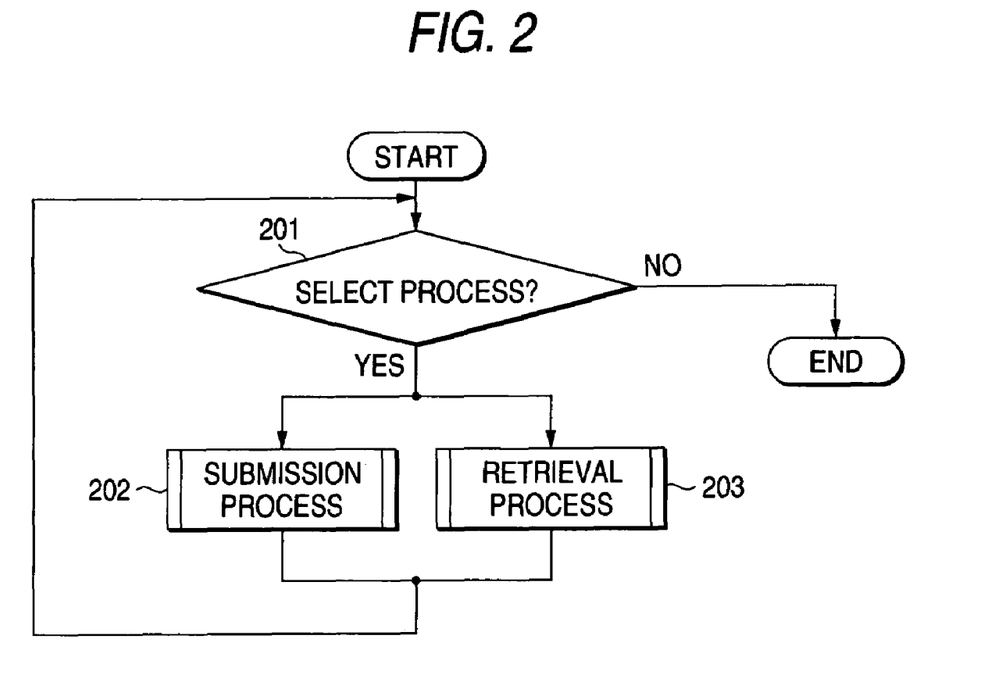
FIG. 2 is a flow chart for explaining the operation of the numerical information retrieving device in FIG. 1.

FIG. 2 is a flow chart for explaining the operation of the numerical information retrieving device in the first embodiment of the present invention.

Referring to FIG. 2, a process is selected by the input means 1 (step 201) so as to execute a submission process (step 202), to execute a retrieval process (step 203), or to end the routine.

Figure 3:
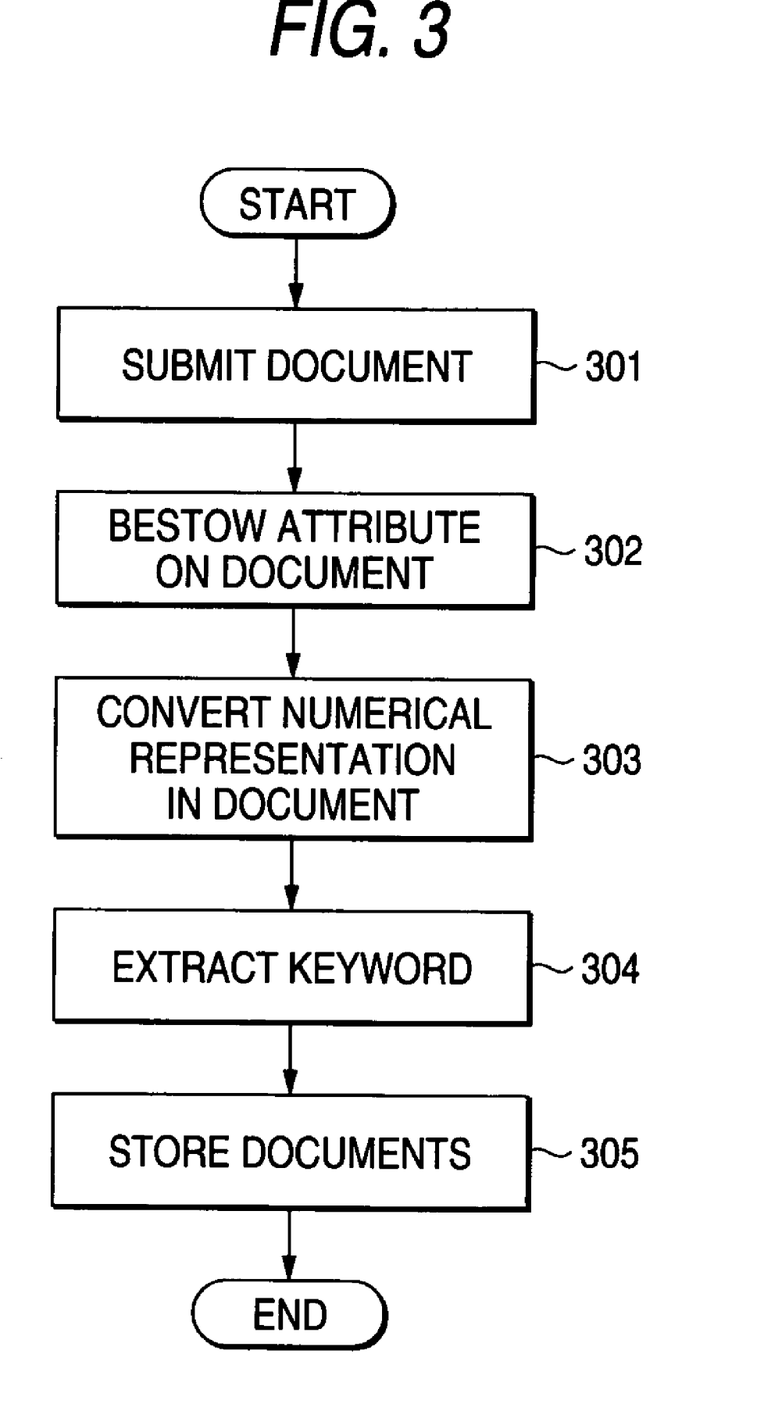
FIG. 3 is a flow chart for explaining the operation of a submission process at a step 202 in FIG. 2.
Figure 4:
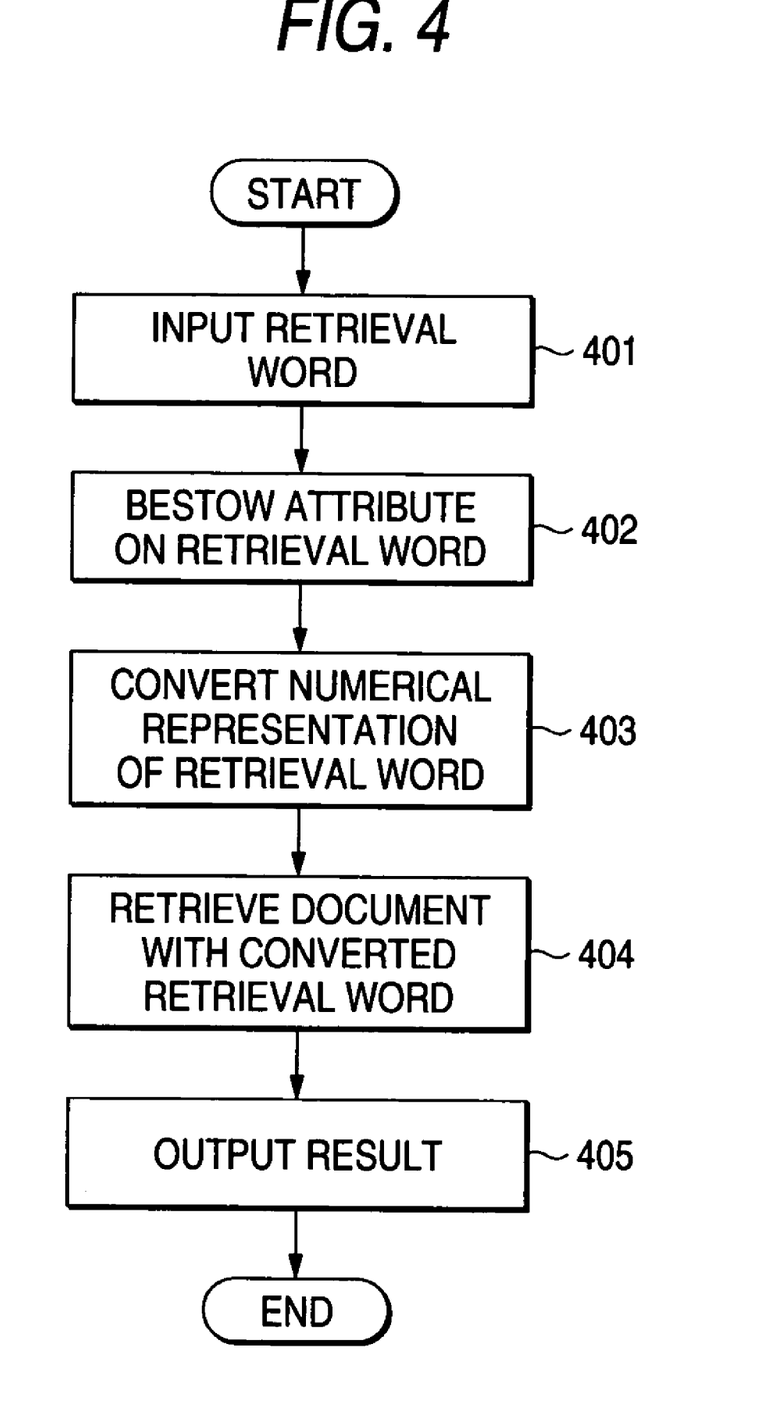
FIG. 4 is a flow chart for explaining the operation of a retrieval process at a step 203 in FIG. 2.

FIG. 3 is a flow chart for explaining the operation of the submission process at the step 202 in FIG. 2 more concretely, while FIG. 4 is a flow chart for explaining the operation of the retrieval process at the step 203 in FIG. 2 more concretely.

Figure 5:
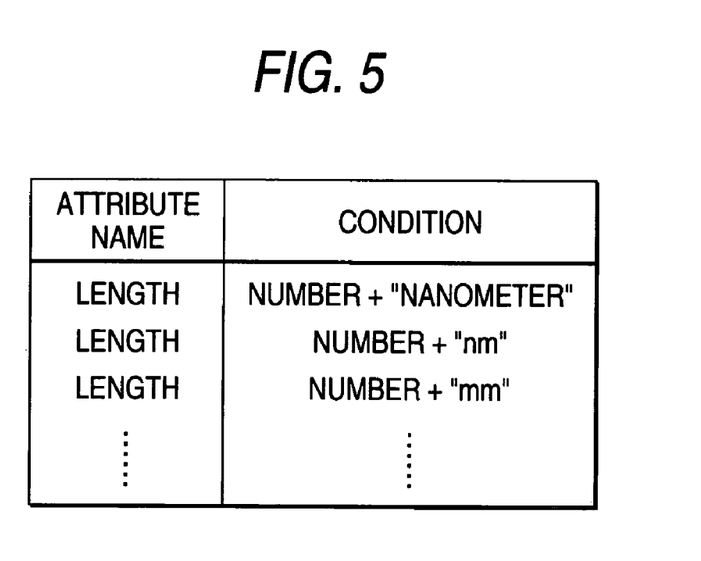
FIG. 5 is a diagram showing a constructional example of an attribute information dictionary in FIG. 1.
Figure 6:
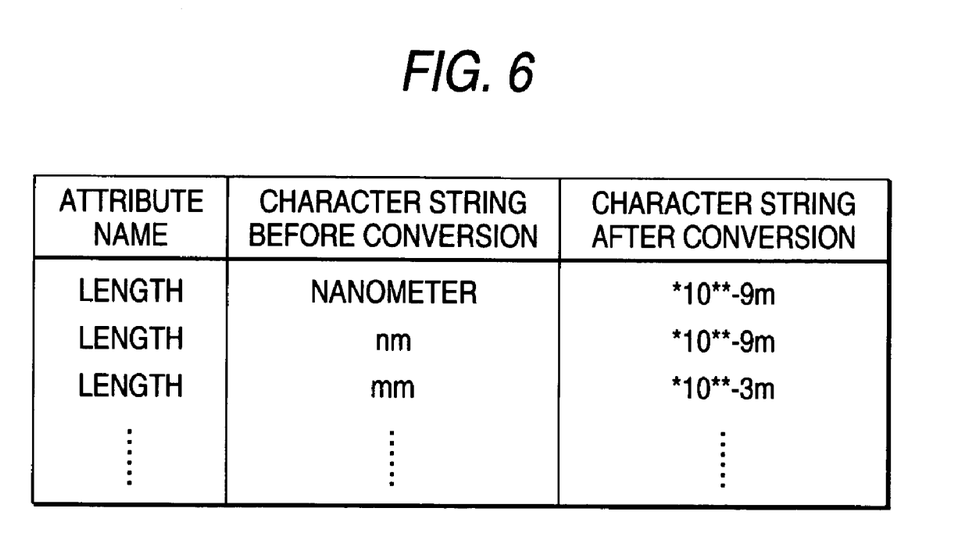
FIG. 6 is a diagram showing a constructional example of a conversion information dictionary in FIG. 1.

Besides, FIG. 5 is a diagram showing the construction of the attribute information dictionary 3, while FIG. 6 is a diagram showing the construction of the conversion information dictionary 5. Incidentally, statements "*10**-9 m" and "*10**-3m" in the converted character strings of the conversion information dictionary 5 in FIG. 6 indicate "$\times 10^{-9}$ m" and "$\times 10^{-3}$ m", respectively.

In the submission process in FIG. 3, a document to be retrieved is first submitted to the input means 1 (step 301).

By way of example, the following illustrative sentence (a), (b) or (c) is submitted:
"Company-A succeeds in development of microfabrication technology of 80 nanometers" (a)
"Company-B is limited to 100 nm" (b)
"Times of limitation to 0.1 mm are remote" (c)

The document submitted to the input means 1 is sent to the attribute bestowal means 2.

Subsequently, in the attribute bestowal means 2, any condition part is searched for from the submitted document by referring to the attribute information dictionary 3 (refer to FIG. 5 as to the detailed construction thereof), and an attribute is bestowed on the condition part (step 302).

The illustrative sentence (a) contains "80 nanometers" as the condition part, the attribute name of which is "LENGTH", Therefore, the "opening tag" <LENGTH> of the attribute and the "closing tag" </LENGTH> thereof are respectively bestowed before and behind the condition part, and the illustrative sentence (a) becomes:
"Company-A succeeds in development of microfabrication technology of <LENGTH> 80 nanometers </LENGTH>"

The illustrative sentence (b) contains "100 nm" as the condition part, the attribute name of which is "LENGTH", Therefore, the tags of the attribute are bestowed before and behind the condition parts, and this illustrative sentence becomes:
"Company-B is limited to <LENGTH> 100 nm</LENGTH>"

Since the illustrative sentence (c) contains "0.1 mm" as the condition part, it becomes the following in the same way:
"Times of limitation to <LENGTH> 0.1 mm </LENGTH> are remote"

The document endowed with the attribute by the attribute bestowal means 2 is sent to the numerical conversion means 4.

Subsequently, in the numerical conversion means 4, the numerical representation of the attribute in the document is converted by referring to the conversion information dictionary 5 (refer to FIG. 6 as to the detailed construction thereof) (step 303).

Regarding the illustrative sentence (a), the numerical representation (:non-converted character string) "nanometer (s)" of the attribute is converted into the converted character string "$\times 10^{-9}$ m", so that this illustrative sentence becomes:
"Company-A succeeds in development of microfabrication technology of <LENGTH> $80 \times 10^{-9}$ m </LENGTH>"

Regarding the illustrative sentence (b), the non-converted character string "nm" is converted into the converted character string "$\times 10^{-9}$ m", so that this illustrative sentence becomes:
"Company-B is limited to <LENGTH> $100 \times 10^{-9}$ m </LENGTH>"

Regarding the illustrative sentence (c), the non-converted character string "mm" is converted into the converted character string "$\times 10^{-3}$ m", so that this illustrative sentence becomes:
"Times of limitation to <LENGTH> $0.1 \times 10^{-3}$ m </LENGTH> are remote"

The document numerically converted by the numerical conversion means 4 is sent to the extraction means 8.

Subsequently, in the extraction means 8, the part of the attribute after the numerical conversion is extracted as a retrieval keyword (step 304).

Regarding the illustrative sentence (a), the part "<LENGTH> $80 \times 10^{-9}$ m </LENGTH>" is extracted as the retrieval keyword.

Regarding the illustrative sentence (b), the part "<LENGTH> $100 \times 10^{-9}$ m </LENGTH>" is extracted as the retrieval keyword.

Regarding the illustrative sentence (c), the part "<LENGTH> $0.1 \times 10^{-3}$ m </LENGTH>" is extracted as the retrieval keyword.

The retrieval keyword extracted by the extraction means 8 is sent to the document storage and retrieval means 6 together with the original document and the document after the attribute bestowal conversion.

Lastly, the original document, the document after the attribute bestowal conversion and the retrieval keyword are stored in the document database 7 by the document storage and retrieval means 6 (step 305), whereupon the submission process is ended.

Regarding the illustrative sentence (a), the original document "Company-A succeeds in development of microfabrication technology of 80 nanometers", the document after the attribute bestowal conversion "Company-A succeeds in development of microfabrication technology of <LENGTH> $80 \times 10^{-9}$ m </LENGTH>", and the retrieval keyword "<LENGTH> $80 \times 10^{-9}$ m </LENGTH>" are stored in the document database 7.

Regarding the illustrative sentence (b), the original document "Company-B is limited to 100 nm", the document after the attribute bestowal conversion "Company-B is limited to <LENGTH> $100 \times 10^{-9}$ m </LENGTH>", and the retrieval keyword "<LENGTH> $100 \times 10^{-9}$ m </LENGTH>" are stored in the document database 7.

Regarding the illustrative sentence (c), the original document "Times of limitation to 0.1 mm are remote", the document after the attribute bestowal conversion "Times of limitation to <LENGTH> $0.1 \times 10^{-3}$ m </LENGTH> are remote", and the retrieval keyword "<LENGTH> $0.1 \times 10^{-3}$ m </LENGTH>" are stored in the document database 7.

In the retrieval process in FIG. 4, a numerical expression to be retrieved is first inputted as a retrieval word to the input means 1 (step 401).

By way of example, the following illustrative sentence (d) is inputted as the retrieval word:

"80 nm" (d)

The numerical expression (:retrieval word) inputted to the input means 1 is sent to the attribute bestowal means 2.

Subsequently, in the attribute bestowal means 2, an attribute is bestowed on the retrieval word by referring to the attribute information dictionary 3 (step 402).

Since the attribute name of the illustrative sentence (d) is "LENGTH", the "opening tag" <LENGTH> of the corresponding attribute and the "closing tag" </LENGTH> thereof are respectively bestowed before and behind the condition part of the attribute. Consequently, the illustrative sentence (d) becomes:

"<LENGTH> 80 nm </LENGTH>"

The numerical expression (:retrieval word) endowed with the attribute by the attribute bestowal means 2 is sent to the numerical conversion means 4.

Subsequently, in the numerical conversion means 4, the numerical representation of the attribute in the retrieval word is converted by searching the conversion information dictionary 5 (step 403).

Regarding the illustrative sentence (d), the numerical representation (:non-converted character string) "nm" of the attribute is converted into the converted character string "$\times 10^{-9}$ m", so that this illustrative sentence becomes:

"<LENGTH> $80 \times 10^{-9}$ m </LENGTH>"

The retrieval word numerically converted by the numerical conversion means 4 is sent to the document storage and retrieval means 6 through the extraction means 8.

Subsequently, any document whose retrieval keyword agrees with the retrieval word after the numerical conversion is retrieved and acquired from documents stored in the document database 7, by the document storage and retrieval means 6 (step 404).

Regarding the illustrative sentence (d), the document of the illustrative sentence (a), "Company-A succeeds in development of microfabrication technology of 80 nanometers" whose retrieval keyword is "<LENGTH> $80 \times 10^{-9}$ m </LENGTH>" is retrieved and acquired from the document database 7, as the document whose retrieval keyword agrees with the retrieval word after the numerical conversion, "<LENGTH> $80 \times 10^{-9}$ m </LENGTH>".

Besides, the document acquired at the step 404 is outputted as a retrieved result from the output means 9 (step 405).

Incidentally, the result output may be any of only the part of the attribute, a proper range before or behind the attribute, and the whole document, and it may be given from any of the original document, the document after the attribute bestowal, and the document after the numerical conversion.

As described above, according to the first embodiment, numerical information items contained in a document are automatically converted into unified representations or unit systems, so that a user can retrieve numerical information without caring about the representations or unit systems.

Second Embodiment

Figure 7:
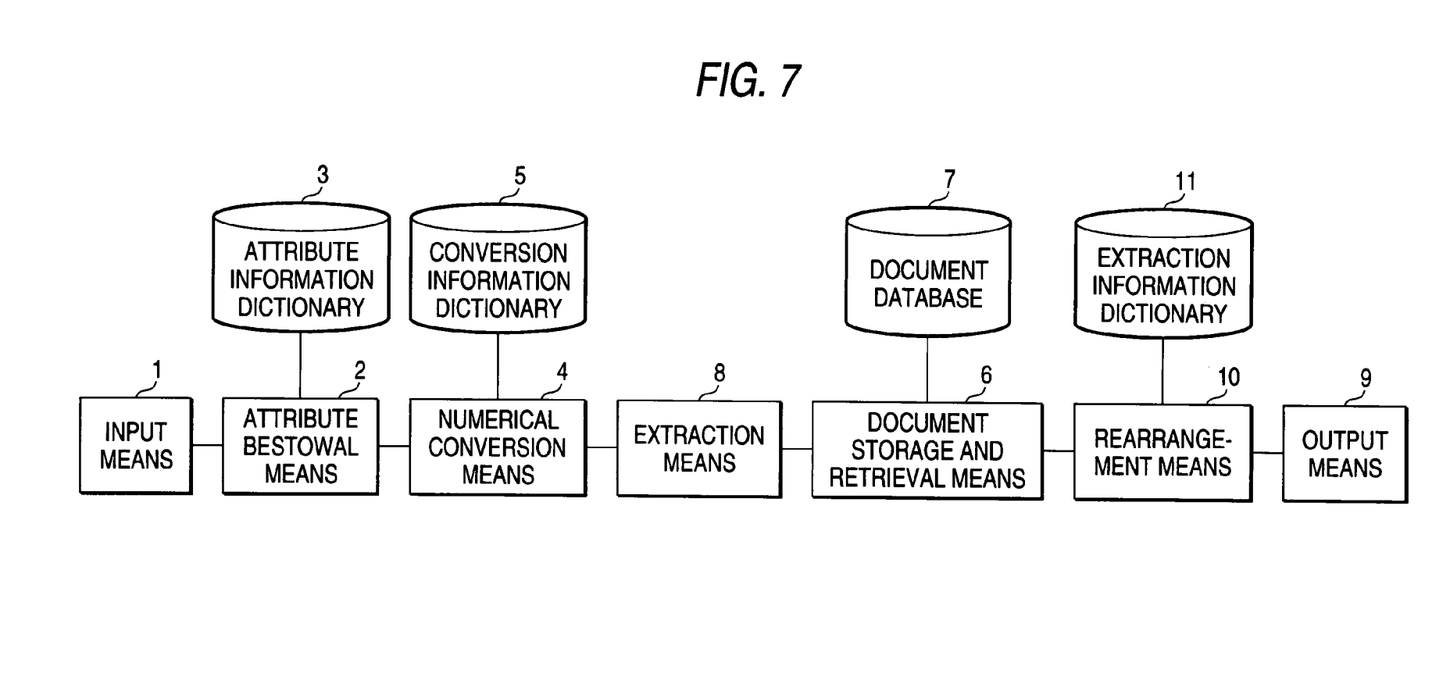
FIG. 7 is a block arrangement diagram of a numerical information retrieving device in the second embodiment of the present invention.

FIG. 7 is a block arrangement diagram of a numerical information retrieving device in the second embodiment of the present invention. By the way, in FIG. 7, identical numerals are assigned to the same or substantially the same constituents as in FIG. 1.

The numerical information retrieving device of the second embodiment includes input means 1, attribute bestowal means 2, an attribute information dictionary 3, numerical conversion means 4, a conversion information dictionary 5, document storage and retrieval means 6, a document database 7, extraction means 8, output means 9, rearrangement means 10, and an extraction information dictionary 11. That is, the second embodiment is such that the rearrangement means 10 and the extraction information dictionary 11 are added to the numerical information retrieving device of the first embodiment shown in FIG. 1.

The rearrangement means 10 is means for rearranging extracted results. The extraction information dictionary 11 is a dictionary for storing the information of extraction and rearrangement therein. The extraction information items in the extraction information dictionary 11 consist of sets of attribute names, range specifying words, comparing conditions, and alignment orders.

The rearrangement means 10 extracts retrieval keywords sent from the document storage and retrieval means 6 and rearranges them in the alignment order, by referring to the extraction information dictionary 11, and it sends the output means 9 documents retrieved from the document database 7.

The general operation of, and the operation of the submission process of, the numerical information retrieving device in the second embodiment are the same as the general operation (refer to FIG. 2), and the operation of the submission process (refer to FIG. 3) in the first embodiment, respectively. Therefore, only the operation of a retrieval process in the second embodiment will be described below.

Figure 8:
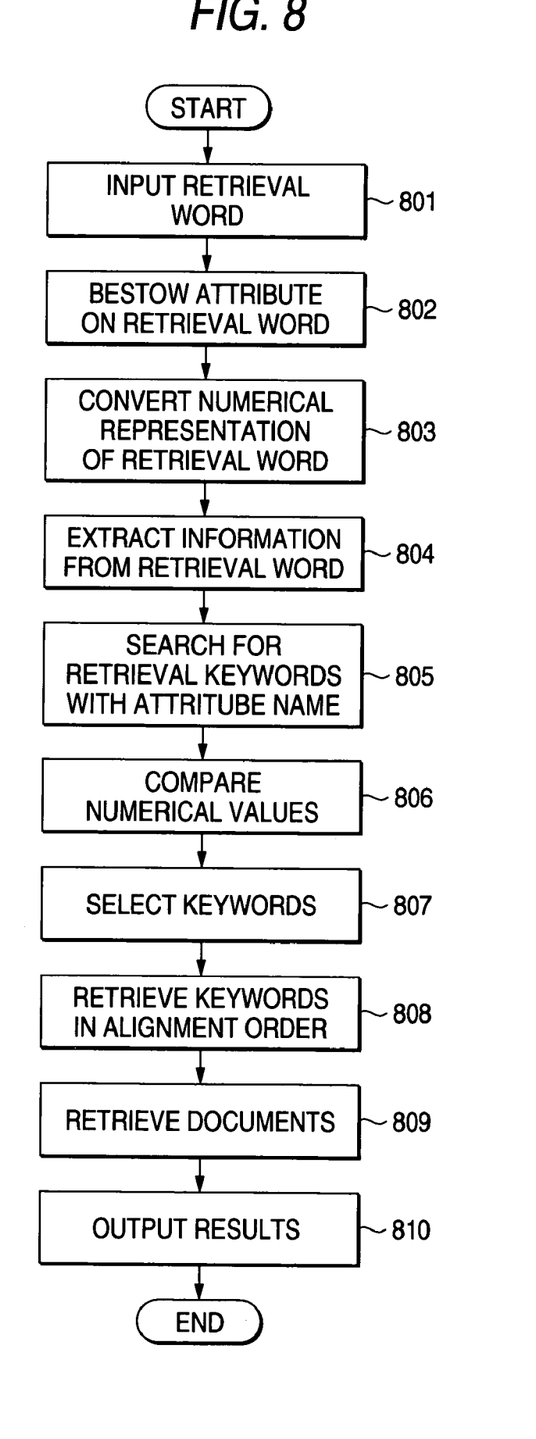
FIG. 8 is a flow chart for explaining the operation of a retrieval process in the numerical information retrieving device in FIG. 7.
Figure 9:
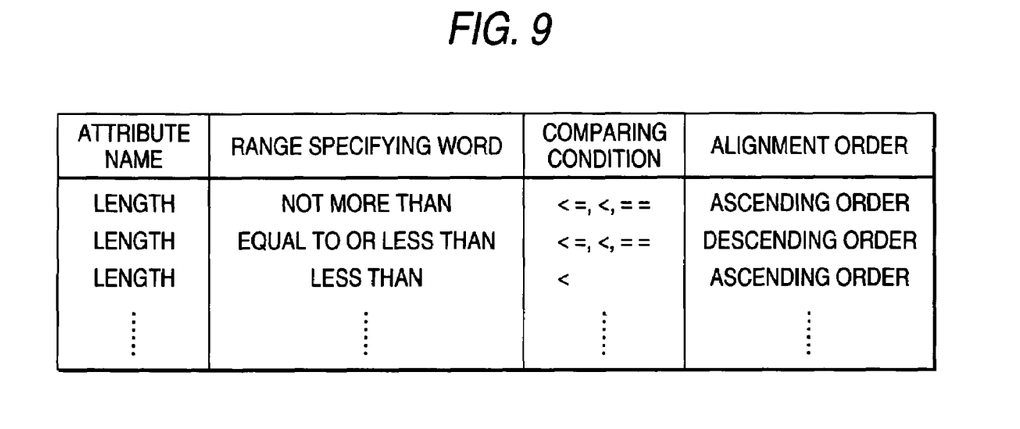
FIG. 9 is a diagram showing the construction of an extraction information dictionary in FIG. 7.

FIG. 8 is a flow chart for explaining the operation of the retrieval process in the numerical information retrieving device in the second embodiment of the present invention. Besides, FIG. 9 is a diagram showing the construction of the extraction information dictionary 11. Incidentally, the statements "<=" and "==" of the comparing conditions of the extraction information dictionary 11 in FIG. 9 indicate "$\leq$" and "=", respectively.

By the way, in the ensuing description of the retrieval process in the second embodiment, it is assumed that the submission processes of the illustrative sentences (a), (b) and (c) used in the description of the operation of the first embodiment have already been made.

In the retrieval process shown in FIG. 8, a numerical expression to be retrieved is first inputted as a retrieval word to the input means 1 (step 801).

By way of example, the following illustrative sentence (e) is inputted as the retrieval word:

"Not more than 100 nm" (e)

The numerical expression (:retrieval word) inputted to the input means 1 is sent to the attribute bestowal means 2.

Subsequently, in the attribute bestowal means 2, a condition part is searched for from the retrieval word so as to bestow an attribute on the condition part, by referring to the attribute information dictionary 3 (step 802).

The illustrative sentence (e) contains "100 nm" as the condition part, the attribute name of which is "LENGTH", Therefore, the "opening tag" <LENGTH> of the attribute and the "closing tag" </LENGTH> thereof are respectively bestowed before and behind the condition part, and the illustrative sentence (e) becomes:

"Not more than <LENGTH> 100 nm </LENGTH>"

The numerical expression (:retrieval word) endowed with the attribute by the attribute bestowal means 2 is sent to the numerical conversion means 4.

Subsequently, in the numerical conversion means 4, the numerical representation of the attribute in the retrieval word is converted by referring to the conversion information dictionary 5 (step 803).

Regarding the illustrative sentence (e), the numerical representation (:non-converted character string) "nm" of the attribute is converted into the converted character string "$\times 10^{-9}$ m", so that this illustrative sentence becomes:

"Not more than <LENGTH> 100–$10^{-9}$ m </LENGTH>"

The retrieval word numerically converted by the numerical conversion means 4 is sent to the extraction means 8.

Subsequently, the attribute name, numerical value and range specifying word after the numerical conversion of the retrieval word are extracted in the extraction means 8 (step 804).

Regarding the illustrative sentence (e), "LENGTH" is extracted as the attribute name, "100–$10^{-9}$ m" as the numerical value, and "Not more than" as the range specifying word.

The attribute name, numerical value, and the range specifying word extracted by the extraction means 8 are sent to the document storage and retrieval means 6.

Subsequently, in the document storage and retrieval means 6, any retrieval keywords whose attribute names agree with the attribute name extracted from the retrieval word are searched for from the retrieval keywords stored in the document database 7 (step 805).

Regarding the illustrative sentence (e), the retrieval keywords whose attribute names are "LENGTH" are searched for. That is, the retrieval keyword "<LENGTH> 80$\times 10^{-9}$ m </LENGTH>" of the illustrative sentence (a), the retrieval keyword "<LENGTH> 100$\times 10^{-9}$ m </LENGTH>" of the illustrative sentence (b), and the retrieval keyword "<LENGTH> 0.1$\times 10^{-3}$ m </LENGTH>" of the illustrative sentence (c) are searched for from the document database 7.

The retrieval keywords searched for from the document database 7 are sent to the rearrangement means 10 together with the retrieval word after the attribute bestowal conversion.

Subsequently, in the rearrangement means 10, the numerical value of the retrieval word is compared with the numerical values of the retrieval keywords searched for from the document database 7, by referring to the extraction information dictionary 11 (refer to FIG. 9 as to the detailed construction thereof) (step 806).

Regarding the illustrative sentence (e), the numerical value of the retrieval word is "100$\times 10^{-9}$ m".

i) In the comparison of this numerical value with the numerical value "80$\times 10^{-9}$ m" of the retrieval keyword of the illustrative sentence (a), $80 \times 10^{-9}$ m "<" $100 \times 10^{-9}$ m holds;

ii) in the comparison thereof with the numerical value "100$\times 10^{-9}$ m" of the retrieval keyword of the illustrative sentence (b), $100 \times 10^{-9}$ m "=" $100 \times 10^{-9}$ m holds; and iii) in the comparison thereof with the numerical value "100$\times 10^{-9}$ m" of the retrieval keyword of the illustrative sentence (c), $0.1 \times 10^{-3}$ m "<" $100 \times 10^{-9}$ m holds.

Subsequently, in the rearrangement means 10, the retrieval keywords as to which the compared results are suited to the comparing condition of the range specifying word are selected by referring to the extraction information dictionary 11 (step 807).

Regarding the illustrative sentence (d), suited to the comparing condition "Not more than" of the range specifying word are the retrieval keyword "<LENGTH> 80$\times 10^{-9}$ m </LENGTH>" of the illustrative sentence (a) as affords the compared result "<", and the retrieval keyword "<LENGTH> 100$\times 10^{-9}$ m </LENGTH>" of the illustrative sentence (b) as affords the compared result Accordingly, the two retrieval keywords are selected.

Subsequently, also in the rearrangement means 10, the selected retrieval keywords are rearranged in the alignment order by referring to the extraction information dictionary 11 (step 808).

Regarding the illustrative sentence (e), the alignment order of the range specifying word "Not more than" is set to be the "ascending order" (refer to FIG. 9), so that the two retrieval keywords are rearranged in the following order:

"<LENGTH> 80$\times 10^{-9}$ m </LENGTH>" (:retrieval keyword of the illustrative sentence (a))

"<LENGTH> 100$\times 10^{-9}$ m </LENGTH>" (:retrieval keyword of the illustrative sentence (b))

The rearranged retrieval keywords are sent to the document storage and retrieval means 6.

Subsequently, in the document storage and retrieval means 6, any documents whose retrieval keywords agree with the rearranged retrieval keywords are retrieved and acquired from the documents stored in the document database 7 (step 809).

Besides, the documents acquired at the step 809 are outputted as retrieved results from the output means 9, in the order of the rearranged retrieval keywords (step 810).

Regarding the illustrative sentence (e), the retrieved results are outputted in the following order:

"Company-A succeeds in development of microfabrication technology of 80 nanometers" (:illustrative sentence (a) mentioned before)

"Company-B is limited to 100 nm" (:illustrative sentence (b) mentioned before)

By the way, in a case where the following illustrative sentence (f) has been inputted as a retrieval word, the range specifying word thereof is "Equal to or less than" (refer to FIG. 9):

"Equal to or less than 100 nm" (f)

Regarding the illustrative sentence (f), the alignment order of the range specifying word "Equal to or less than" is set to be the "descending order" (refer to FIG. 9). Therefore, the retrieval keywords are rearranged in the following order:

"<LENGTH> 100×10$^{-9}$ m </LENGTH>" (:retrieval keyword of the illustrative sentence (b))

"<LENGTH> 80×10$^{-9}$ m </LENGTH>" (:retrieval keyword of the illustrative sentence (a))

Besides, the retrieved results are outputted in the following order:

"Company-B is limited to 100 nm" (:illustrative sentence (b) mentioned before)

"Company-A succeeds in development of microfabrication technology of 80 nanometers" (:illustrative sentence (a) mentioned before)

That is, the alignment order and the output order in this case become opposite to those in the case where the range specifying word is "Not more than".

As described above, according to the second embodiment, the expressions of ranges are converted into the relations of the magnitudes of numerical values so as to compare the numerical values, whereby a user can retrieve numerical information without caring about numerical formulae. Moreover, retrieved results are rearranged in accordance with the expression of the range, whereby the user can efficiently confirm the retrieved results. Furthermore, the retrieval of the numerical expressions is facilitated by applying the embodiment to ordinary retrieval in a natural language.

Incidentally, although the method of inserting attribute tags into an original text has been employed as an attribute bestowal method in the first and second embodiments, another method may well be employed in the present invention. It is also considered to employ, for example, a method in which the original text is not altered, and in which the "attribute information data of the original text" stating such information that "the 35th to the 40th characters of the original text have the attribute of "LENGTH"" are held independently of the original text.

Besides, although the numerical information retrieving devices each of which handle only numerical information as retrieval words and documents to-be-retrieved have been described in the first and second embodiments, the present invention is also usable in combination with any retrieving method or any retrieving device which handles terms other than numerical values, as retrieval words or documents to-be-retrieved.

As thus far described, the present invention brings forth the advantage that, owing to execution of numerical conversion, a user can retrieve numerical information without caring about representations or unit systems.

What is claimed is:

1. A numerical information retrieving device for retrieving numerical information, comprising:

input means for inputting a document to be retrieved, the document containing a numerical expression in a first form;

an attribute information dictionary which stores therein attribute names indicative of attributes, and conditions under which the attributes are bestowed;

attribute bestowal means for bestowing an attribute on the numerical expression in the inputted document by referring to the attribute information dictionary;

a conversion information dictionary which stores attribute names indicate of attributes, non-converted character strings, and converted character strings therein;

numerical conversion means for converting the numerical expression having the attribute bestowed by the attribute bestowal means, from a non-converted character string into a converted character string by referring to the conversion information dictionary, to convert the numerical expression into a numerical expression in a second form;

extraction means for extracting a retrieval keyword from the document after conversion by the numerical conversion means;

a document database which stores document data therein;

document storage and retrieval means for storing the document after the conversion by the numerical conversion means, the inputted document, and the extracted retrieval keyword in the document database; and output means for outputting a retrieved result;

wherein the document storage and retrieval means retrieves any document whose retrieval keyword agrees with the numerical expression after the conversion by the numerical conversion means, from the document database, and sends the retrieved document as the retrieved result to said output means.

2. A numerical information retrieving device for retrieving numerical information, comprising:

input means for inputting a document to be retrieved, the document containing a numerical expression in a first form;

an attribute information dictionary which stores therein attribute names indicative of attributes, and conditions under which the attributes are bestowed;

attribute bestowal means for bestowing an attribute on the numerical expression in the inputted document by referring to the attribute information dictionary;

a conversion information dictionary which stores attribute names indicate of attributes, non-converted character strings, and converted character strings therein;

numerical conversion means for converting the numerical expression having the attribute bestowed by the attribute bestowal means, from a non-converted character string into a converted character string by referring to the conversion information dictionary, to convert the numerical expression into a numerical expression in a second form;

extraction means for extracting a retrieval keyword from the document after conversion by the numerical conversion means;

a document database which stores document data therein;

document storage and retrieval means for storing the document after the conversion by the numerical conversion means, the inputted document, and the extracted retrieval keyword in the document database;

an extraction information dictionary which stores therein attribute names indicative of attributes, range specifying words indicative of expressions of ranges, comparing conditions indicative of relations of magnitudes of comparisons, and alignment orders indicative of orders to rearrange outputs;

rearrangement means to rearrange the outputs; and output means for outputting retrieved results;

wherein the extraction means extracts an attribute name, a numerical value and a range specifying word from the numerical expression after the conversion by the numerical conversion means;

wherein the rearrangement means compares the numerical value extracted from the numerical expression, with respective numerical values of a plurality of retrieval keywords whose attribute names agree with the attribute name extracted from the numerical expression, and selects the retrieval keywords as to which results of the comparisons are suited to a selected one of the comparing conditions of the range specifying word and rearranges the selected retrieval keywords in a selected one of the alignment orders, by referring to the extraction information dictionary; and wherein the document storage and retrieval means searches for retrieval keywords whose attribute names agree with the attribute name extracted from the numerical expression, from said document database, and sends the keywords searched for, to the rearrangement means, and the document storage and retrieval means also retrieves any of a plurality of documents which agree with the rearranged retrieval keywords, from within the document database, and sends the retrieved documents as the retrieved results to the output means, in the order of the rearranged retrieval keywords.

3. A numerical information retrieving device for retrieving numerical information, comprising:

input means for inputting a document to be retrieved, the document containing a numerical expression in a first form;

an attribute information dictionary which stores therein attribute names indicative of attributes, and conditions under which the attributes are bestowed;

attribute bestowal means for bestowing an attribute on the numerical expression in the inputted document by referring to the attribute information dictionary;

a conversion information dictionary which stores attribute names indicate of attributes, non-converted character strings, and converted character strings therein;

numerical conversion means for converting the numerical expression having the attribute bestowed by the attribute bestowal means, from a non-converted character string into a converted character string by referring to the conversion information dictionary, to convert the numerical expression into a numerical expression in a second form;

extraction means for extracting a retrieval keyword from the document after conversion by the numerical conversion means;

a document database which stores document data therein; and document storage and retrieval means for storing the document after the conversion by the numerical conversion means, the inputted document, and the extracted retrieval keyword in the document database, wherein the attribute bestowal means bestows an opening tag and a closing tag of the attribute before and behind a condition part of an original sentence, respectively, by referring to the attribute information dictionary.

4. A numerical information retrieving device for retrieving numerical information, comprising:

input means for inputting a document to be retrieved, the document containing a numerical expression in a first form;

an attribute information dictionary which stores therein attribute names indicative of attributes, and conditions under which the attributes are bestowed;

attribute bestowal means for bestowing an attribute on the numerical expression in the inputted document by referring to the attribute information dictionary;

a conversion information dictionary which stores attribute names indicate of attributes, non-converted character strings, and converted character strings therein;

numerical conversion means for converting the numerical expression having the attribute bestowed by the attribute bestowal means, from a non-converted character string into a converted character string by referring to the conversion information dictionary, to convert the numerical expression into a numerical expression in a second form;

extraction means for extracting a retrieval keyword from the document after conversion by the numerical conversion means;

a document database which stores document data therein; and document storage and retrieval means for storing the document after the conversion by the numerical conversion means, the inputted document, and the extracted retrieval keyword in the document database, wherein the attribute bestowal means bestows the attribute by referring to the attribute information dictionary, and attribute information data indicative of the attribute of a condition part in an original sentence is held separately from the inputted document without altering the inputted document.

* * * * *

UNITED STATES PATENT AND TRADEMARK OFFICE
CERTIFICATE OF CORRECTION

PATENT NO. : 7,280,997 B2
APPLICATION NO. : 10/722567
DATED : October 9, 2007
INVENTOR(S) : Miki Sasaki et al.

It is certified that error appears in the above-identified patent and that said Letters Patent is hereby corrected as shown below:

Title page, item 75 (Inventors)

Please change the first inventor's name "Mkiki Sasaki" to:

--Miki Sasaki--

Signed and Sealed this

Fourth Day of December, 2007

JON W. DUDAS
*Director of the United States Patent and Trademark Office*